UNITED STATES PATENT OFFICE.

FREDERICK F. HUNT, OF NEW YORK, N. Y.

MANUFACTURE OF SOLUBLE BARIUM SALTS.

1,070,810. Specification of Letters Patent. Patented Aug. 19, 1913.

No Drawing. Application filed August 27, 1912. Serial No. 717,269.

*To all whom it may concern:*

Be it known that I, FREDERICK F. HUNT, a citizen of Canada, residing at New York, in the county of New York and State of New York, have invented certain new and useful Improvements in the Manufacture of Soluble Barium Salts, of which the following is a specification.

This invention relates to the manufacture of soluble barium salts; and it comprises a process wherein certain waste residues containing barium compounds insoluble in water but soluble in certain acids such as hydrochloric are treated with the necessary amount of such an acid, are then dried and heated sufficiently to char organic matter or to break up or render insoluble compounds of such impurities as iron oxid and alumina, and are then leached with water to obtain a solution of a soluble barium salt, the salt being subsequently crystallized from such solution in any convenient way; all as more fully hereinafter set forth and as claimed.

In the manufacture of certain compounds of barium from barytes or other forms of barium sulfate, it is customary to furnace the sulfate in admixture with coal, coke or the like to effect a reduction of the sulfate to sulfid, the soluble barium sulfid being then leached from the furnaced mass and further treated as may be required to obtain the desired final product, or the sulfid may be used as such. Sometimes other materials such as calcium chlorid or sodium chlorid are also added to the mixture to be furnaced where it is desired to obtain barium chlorid directly from the operation. The greater part of the barium in the ore is obtained by these operations and the residue remaining after leaching comprising insoluble gangue, etc., has hitherto been considered waste material of no value whatever. I have discovered however that these furnaced residues even if carefully leached still contain more or less barium in the form of compounds which, while substantially insoluble in water and therefore not affected by the final leaching step succeeding the furnacing, are nevertheless susceptible of recovery by means of a carefully regulated acid treatment and leaching as more fully hereinafter described. Moreover in most of these residues which have been heretofore discarded as valueless, the residual barium compounds are present in sufficient quantities to render their extraction and isolation commercially profitable when the extraction is carried out according to the present process.

One of the important advantages of the present process resides in the fact that by its use not only can the valuable barium content of the furnaced and leached residues be obtained as a useful soluble salt by simple and inexpensive treatment, but the purity of the product thus obtained is relatively high, rendering it directly applicable in the manufacture of pigments, or in other connections without further purification. The present invention therefore enables the utilization of a new and heretofore disregarded source of a valuable material.

In a typical embodiment of the present process, I may treat the residues remaining after leaching more or less completely the furnaced mass obtained by roasting ground barytes with coal in the manufacture of barium sulfid and hydrate. These residues, as I have found, contain more or less barium carbonate and also a compound of barium which appears to be the sulfite or something akin to the sulfite. At all events, upon treating a sample of the residues with hydrochloric acid for example, a strong odor of $SO_2$ is evolved. Whatever this compound may be, it is decomposable by hydrochloric acid with the formation of a water soluble barium salt. The carbonate is also similarly affected by the acid used. Some residues of the type indicated I have found to contain as high as 50 per cent. of barium thus soluble in acid. Barium sulfate is also sometimes present in small percentages, but this is practically unaffected by the present process and cannot be considered as an available form of barium for present purposes.

While the process is especially useful in treating leached residues, it may, of course, be applied to furnaced but unleached materials for the purpose of obtaining an increased yield of a soluble barium salt in one leaching.

The first step in my new process as applied to leached residues is therefore to treat the residues with suitable quantities of an acid giving water soluble barium salts, to break up the acid soluble combinations of barium which have withstood the leaching with water and which have therefore remained behind. I may, of course, grind the residues before treating them with acid. Ordinarily I avoid adding any great excess of acid for two principal reasons. In the first place any unnecessary excess of acid would be simply wasted, and in the second place I wish to avoid as far as possible solubilizing impurities such as iron and alumina, which invariably are present in residues of this character. These impurities may, for the most part, have been rendered more or less water insoluble by the principal furnacing operation from which the residues result; but a large excess of acid in the first step of my process would tend to again solubilize them to a greater or less extent. Accordingly it is better to add only about enough acid to combine with the acid soluble barium estimated to be present in the residues leaving the iron and alumina untouched; that is, a chemically equivalent amount, or approximately such an amount. A slight excess of acid does no great harm, however, since it is eliminated in the succeeding drying and roasting treatment, and any soluble compounds of iron and alumina which may have resulted from the treatment with acid are rendered insoluble in water. In practice hydrochloric acid is the acid which I find most advantageous in the present process, both because of the high solubility of the product, barium chlorid, obtained with its use, and because barium chlorid is the barium salt commercially preferred for use in many industries utilizing barium salts. Moreover barium chlorid crystallizes well and enables me to get a pure final product.

The strength of the hydrochloric acid employed may vary considerably, depending somewhat upon the barium content of the particular residues treated. It is desirable that the mass, after the addition of the acid, shall be simply moist throughout, or in the form of a rather thick mud or semi-liquid mass. The necessary amount of HCl to combine with the barium in the residues may therefore be carried by a large or small proportion of water, this depending upon whether the percentage of barium is low or high. It does no harm to have considerably more moisture in the acidified mixture than above indicated; except that the more moisture is present the longer and more expensive is the subsequent drying operation. The volume of the aqueous acid added to the residues should be sufficient to insure efficient penetration of the acid to every part of the mix in order to solubilize all the barium possible. For practical purposes I find hydrochloric acid of about 1.15 specific gravity suitable for the usual run of residues.

After the residues have been thoroughly moistened with hydrochloric acid, they are dried and then heated to a dull red heat to char and fix organic matter so that it will not contaminate the leachings subsequently obtained. At the same time, any soluble iron and alumina compounds are also broken up and fixed as insoluble oxids. Practically no soluble iron and alumina compounds should be formed if the proper proportion of acid has been used. This heating or roasting serves also to eliminate any excess of hydrochloric acid that may be present as well as all sulfurous acid. As a result, the mass is substantially freed of soluble acid constituents and impurities. The roasted mix is then leached with water and a perfectly neutral solution containing little else than barium chlorid is obtained which is especially well adapted for crystallizing out barium chlorid of high purity. As barium chlorid is much more soluble in hot than in cold water, the leaching may advantageously be carried on hot in order to obtain relatively concentrated leachings. The mother liquors from previous crystallizations may of course be used in leaching. A preliminary evaporation to suitable crystallizing concentration may be necessary should the leachings be too dilute for direct crystallization.

While other residues containing acid soluble compounds of barium may be advantageously treated according to the present process, I regard the process as particularly suited to the recovery of barium in soluble form from furnaced barytes residues either leached or unleached, such as are hereinbefore described.

What I claim is:—

1. The process of obtaining soluble barium salts from materials containing barium in acid soluble form which comprises moistening such materials with a limited quantity of an acid forming a water soluble salt with barium and thereby producing a semi-liquid or mud-like mixture, drying the mixture and heating it to render impurities insoluble, and leaching the heated mixture to obtain a solution of a barium salt.

2. The process of obtaining soluble barium salts from materials containing barium in acid soluble form which comprises moistening such materials with an acid forming a water soluble salt with barium, the acid being added in amount approximately chemically equivalent to the available barium present in the residues, drying the mixture and heating it to render impurities insoluble, leaching the heated mixture to obtain a solution of a barium salt, and crystallizing said salt from the leachings.

3. The process of obtaining soluble barium salts from residues containing barium in acid soluble form which comprises treating such residues with hydrochloric acid, drying and heating the resultant mixture to render impurities insoluble, and leaching the product with water to obtain a solution of barium chlorid.

4. The process of obtaining soluble barium salts from residues containing barium in acid soluble form which comprises treating such residues with hydrochloric acid, drying and heating the resultant mixture to render impurities insoluble, leaching the product with water to obtain a solution of barium chlorid, concentrating the leachings, and crystallizing barium chlorid therefrom.

5. The process of obtaining soluble barium salts from residues containing barium in acid soluble form which comprises adding to the residues from furnacing barytes a sufficient quantity of an acid to solubilize the acid soluble barium compounds therein, drying and heating the mixture to fix impurities, and leaching the product with water to obtain a solution of a barium salt.

6. The process of obtaining soluble barium salts from residues containing barium in acid soluble form which comprises adding to the residues from furnacing barytes a sufficient quantity of hydrochloric acid to solubilize the acid soluble barium compounds contained therein, drying and heating the mixture to fix impurities, and leaching the product with water to obtain a solution of barium chlorid.

7. The process of obtaining soluble barium salts from residues containing barium in acid soluble form which comprises adding to the residues from furnacing barytes a sufficient quantity of hydrochloric acid to solubilize the available barium compounds contained therein without materially affecting any ferric oxid and alumina present, drying and heating the mixture to fix impurities, and leaching the product with water to obtain a solution of barium chlorid.

8. The process of obtaining soluble barium salts from residues containing barium in acid soluble form which comprises adding to the residues from furnacing barytes a sufficient quantity of hydrochloric acid to solubilize the available barium compounds contained therein without materially affecting any ferric oxid and alumina present, drying and heating the mixture to fix impurities, leaching the product with water to obtain a solution of a barium chlorid and crystallizing barium chlorid of high purity therefrom.

In testimony whereof, I affix my signature in the presence of two subscribing witnesses.

FRED. F. HUNT.

Witnesses:
 Jos. L. Thomson,
 Ernest J. Hauser.